D. FULLER.
Gate.
No. 68,726.
Patented Sept. 10, 1867.
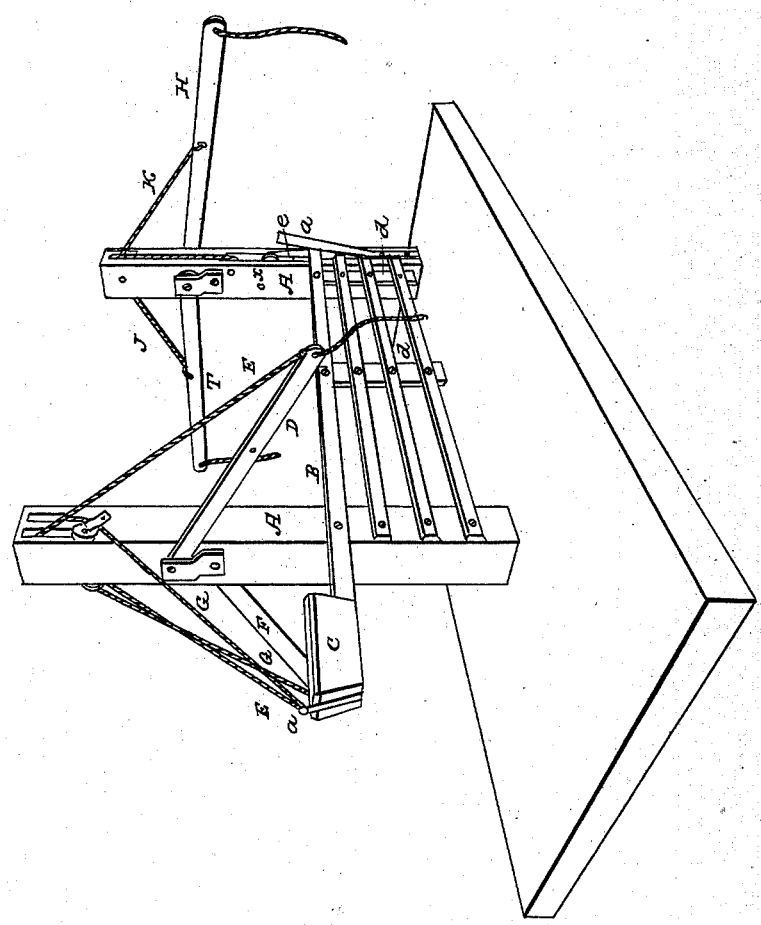

United States Patent Office.

DANIEL FULLER, OF OAKWOOD, MICHIGAN.

Letters Patent No. 68,726, dated September 10, 1867.

---

IMPROVEMENT IN GATES.

---

The Schedule referred to in these Letters Patent and making part of the same.

---

TO ALL WHOM IT MAY CONCERN:

Be it known that I, DANIEL FULLER, of Oakwood, in the county of Oakland, and in the State of Michigan, have invented certain new and useful Improvements in Gates; and do hereby declare that the following is a full, clear, and exact description thereof, reference being had to the accompanying drawings, and to the letters of reference marked thereon.

In the annexed drawings, making part of this specification, A' represents the front and A the rear gate-post, which are set in the ground at a suitable distance apart. B represents the gate, the slats of which are pivoted to the rear gate-post. d d are the vertical bars of the gate, which are pivoted to the slats, as represented. This gate does not swing upon hinges, but closes or shuts up against the rear post. The rear end of the upper slat of the gate is provided with a weight, C, which causes the said rear end to drop and the front ends of the slats to rise, when they are set free by drawing back the latch e. D and F and H I are levers, the first two having their inner ends pivoted to the rear post A, while the other two have their inner ends pivoted to the front post A'. E and G represent cords, which have one end secured to the outer ends of the levers D F, and which run over pulleys in the gate-post A, and then secured at their other ends to the weight C. Cord E runs from lever D, and the cord G from lever F. J and K represent cords, which have one end secured to the levers I and H, and their other ends connecting to the latch e. These cords run through openings in the post A' and pass over pulleys, in such a manner that each one acts upon the latch to draw it back to free the gate. e represents the latch, which consists of a spring-bar, with a catch or notch upon it, said bar being secured in the front post, with its notch projecting so as to catch the upper slat of the gate. a represents a spring-guide, which forces the slat into the catch of the latch e. The outer end of each lever has a cord depending from it, by means of which the lever is operated.

When one approaches the gate and wishes to open it he draws upon the cord of lever H or I, according to the side upon which he approaches. This draws back the latch and frees the gate. The weight C bears down the outer end of the slat to which it is attached, which throws the other ends of all of the slats up in almost a vertical position, thus opening the gate-way. As the ends of the slats rise so do the outer ends of the levers D and F, so that when the operator has passed through the gate that lever D or F, the outer end of which he approaches, is elevated, so that he can readily catch its cord. By catching this cord and drawing it downward the weight C is raised, and the forward ends of the slats of the gate fall until the upper one is caught under the latch e.

Thus it will be seen that the operator draws down a lever secured to the front post to open the gate, while he draws down one attached to the rear post to close it.

Having thus fully described my invention, what I claim as new, and desire to secure by Letters Patent, is—

The levers D and F and H I, with their cords E G and J K, when arranged with the gate-posts and their pulleys, and the gate with its slats pivoted to the rear post, the whole operating as and for the purpose specified.

In testimony that I claim the foregoing I have hereunto set my hand this 24th day of June, 1867.

DANIEL FULLER.

Witnesses:
 JOHN P. LE ROY,
 JAMES CARHARDT.